E. THOMSON.
ELECTRICAL WELDING OF SHEET METAL.
APPLICATION FILED OCT. 21, 1909.

1,078,225.

Patented Nov. 11, 1913.

Witnesses:
Irene Lyhburg
Edward M Jellinek

Inventor
Elihu Thomson
By his Attorneys
Townsend & Decker

UNITED STATES PATENT OFFICE.

ELIHU THOMSON, OF SWAMPSCOTT, MASSACHUSETTS, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

ELECTRICAL WELDING OF SHEET METAL.

1,078,225. Specification of Letters Patent. Patented Nov. 11, 1913.

Application filed October 21, 1909. Serial No. 523,766.

*To all whom it may concern:*

Be it known that I, ELIHU THOMSON, a citizen of the United States, and a resident of Swampscott, in the county of Essex and State of Massachusetts, have invented certain new and useful Improvements in Electrical Welding of Sheet Metal, of which the following is a specification.

My invention relates to that class of metal work in which plates or sheets of metal are united by spot welds as described in the patent to A. F. Rietzel, No. 928,701, dated July 20th, 1909.

The object of my invention is to permit work of that character to be readily and economically produced by the use of pieces of metal operating to localize the heating and pressure in the point or points of welded union.

Briefly stated, my invention consists in the provision of a string or chain of metal pieces each of which is adapted to localize the electric heating and area of each spot weld while the connections between said pieces are adapted to predetermine the spacing and relative location of the spots either or both.

Figure 1:
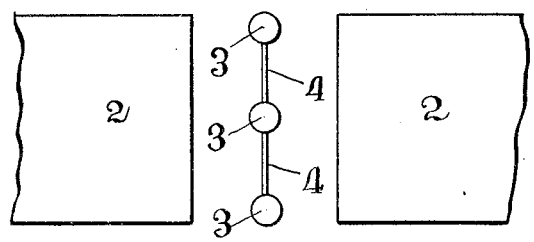
Figure 2:
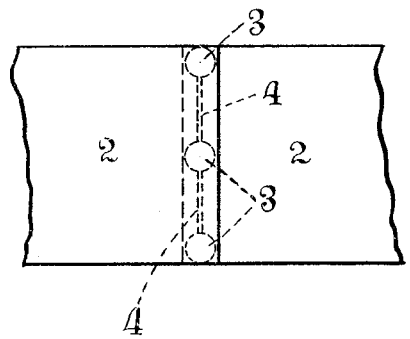
Figure 3:
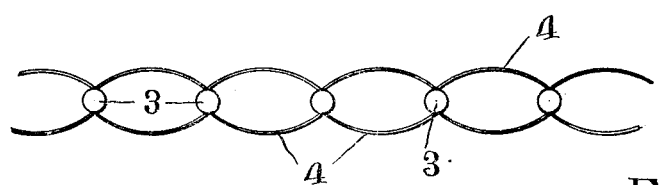
Figure 4:
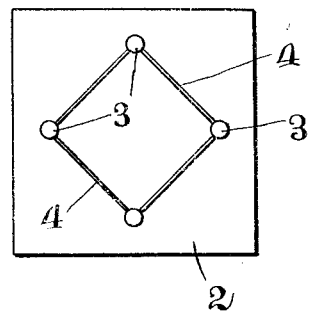

In the accompanying drawings, Figure 1 shows in plan two sheets or plates of metal and a string or chain of pieces of metal adapted for use in welding said plates or sheets together by the spot welding process aforesaid. Fig. 2 shows said plates or sheets superposed or lapped and with the pieces of metal interposed and in position which they would occupy when the two plates are placed between the welding electrodes. Fig. 3 illustrates a modification in the form of the connection between the pieces. Fig. 4 shows a string or chain of pieces arranged to determine their spacing and relative disposition so as to determine the location of the spots of welded union within the boundaries of the plate or sheet of metal to be united to the surface of another plate.

Referring to Fig. 1, the ends of the two sheets of metal to be united on their opposed lapped surfaces are indicated by the numeral 2, while 3 indicates a string or chain of small disks or pieces of metal connected by links or connecting portions 4. Said pieces 3 may be of sheet metal and the connections 4 whereby they form a string or chain of pieces may be of any material desired and flexible or not, as found convenient. The connections 4 may be of some substance which would be fusible or otherwise destructible in the process and either wholly or merely at their points of connection with the pieces, or they may be very fine or thin strips of metal which may be somewhat thinner than the pieces 3, so that the electric welding current would be more fully confined to the pieces 3. Conveniently, the chain of pieces may be cut from sheet metal, the intermediate portions 4 being thin or not, as found desirable. The assembling of the pieces 2 with the pieces 3 interposed for welding is shown clearly in Fig. 2. The pieces 3 might also be connected up into a ring or endless chain or string, as illustrated in Fig. 4 and the connections 4 might be sufficiently stiff to practically determine the relative position of the pieces 3 to one another, as well as their distance apart, when they are placed upon the sheet of metal 2, to localize the welding of the same to an opposed sheet or plate at spots coincident with the pieces 3.

The manner of connecting the uniting parts 4 to the pieces 3 obviously forms no part of my invention. In the case of the arrangement shown in Fig. 4 as well as in the other cases, the whole chain may be formed by striking it up from sheet metal.

Obviously, my invention is not confined to the exact shape of the contact pieces and their connections and many variations may be made in the same without departing from my invention.

What I claim as my invention is:

1. A string of contact pieces for electric spot welding, each said piece being adapted to localize the electric heating and area of each spot weld to the desired extent in the surface of the welded pieces and the members of said string being connected to one another by comparatively narrow spacing connections adapted to predetermine the spacing of the spots of welded union.

2. A string of electric contacts for electric spot welding consisting of pieces of sheet metal joined by comparatively narrow sheet metal spacing connections integral with them, said connections being of length to predetermine the spacing of the spots of welded union.

Signed at Lynn in the county of Essex and State of Massachusetts this 19th day of October A. D. 1909.

ELIHU THOMSON.

Witnesses:
JOHN A. McMANUS, Jr.,
ROBERT SHAND.

Copies of this patent may be obtained for five cents each, by addressing the "Commissioner of Patents, Washington, D. C."